June 17, 1941. A. U. HUGGENBERGER 2,246,175
STRAIN GAUGE
Filed March 14, 1939
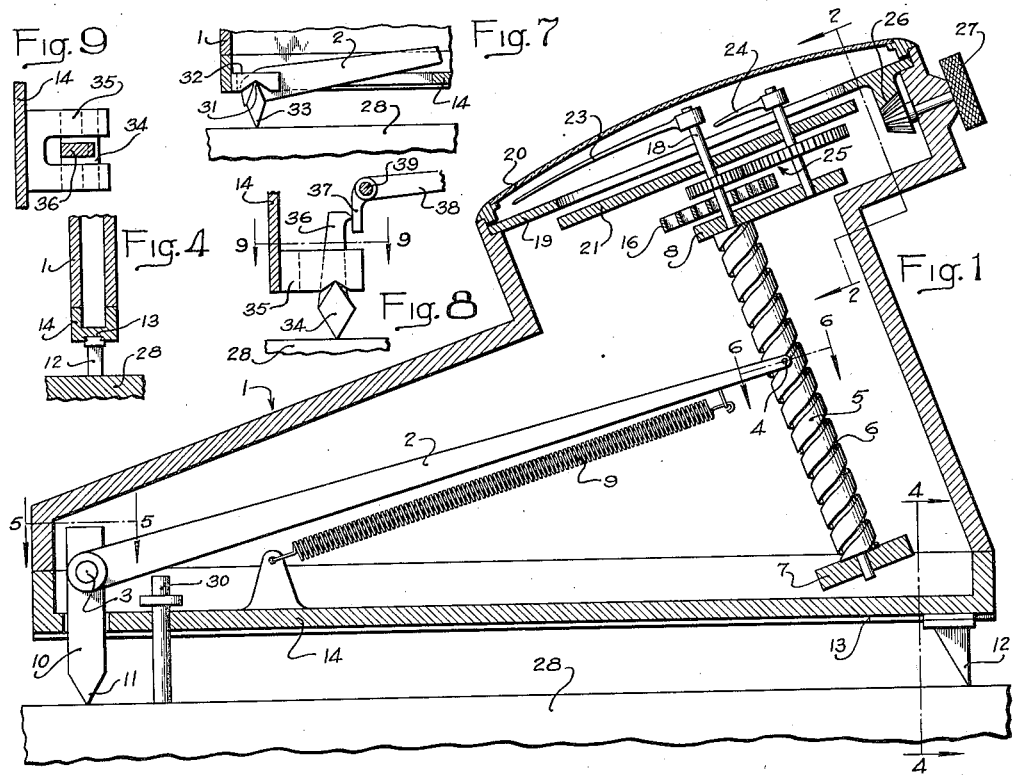
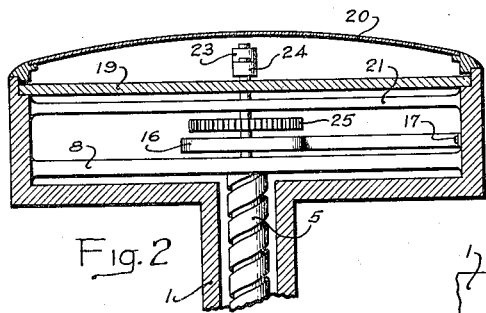
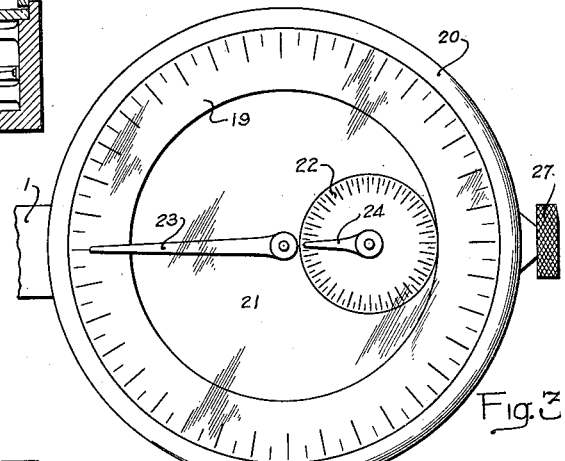
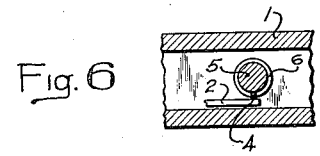
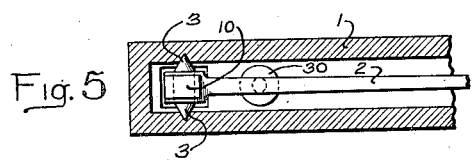
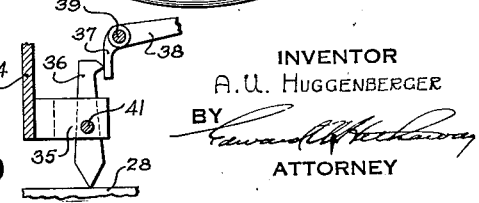
INVENTOR
A. U. HUGGENBERGER
BY
ATTORNEY Patented June 17, 1941

2,246,175

UNITED STATES PATENT OFFICE 2,246,175

STRAIN GAUGE

Arnold U. Huggenberger, Zurich, Switzerland

Application March 14, 1939, Serial No. 261,801
In Switzerland October 17, 1938

3 Claims. (Cl. 33—148)

This invention relates generally to strain gauges for measuring and indicating the strain of material specimens or of life size members.

The quantity to be measured is usually indicated in a greatly enlarged scale on a dial by means of a special mechanism which heretofore has included only levers or only pinions or a combination of these elements. Operation of this mechanism requires a force of certain amount, sometimes called a "force of shift." This force of shift gives rise to a certain reactive force which acts upon the measuring instrument on the one hand and upon the object to be measured on the other hand. If the force of shift is great and the test specimen is of a certain softness, a reaction may occur which prevents precision transfer of the quantity to be measured. It is therefore of basic importance for a correct measurement that the force of shift be as small as possible. Prior art devices which employ pinions alone, or pinions in combination with levers, require a relatively great force of shift so that these measuring instruments cannot be used for highly sensitive measurements.

In testing materials it is also necessary under certain circumstances to determine the hysteresis characteristics of the material. This value represents the permanent deformation or elongation remaining after loading and unloading the test specimens. Also, a test may frequently pass the yield point of the material thereby necessitating an especially great range of measuring since the deformation upon reaching the yield point increases rapidly. On the other hand, during an unloading operation a permanent elongation is usually a very small quantity which has to be ascertained with great accuracy. These two requirements, i. e. a great measuring range and great accuracy and sensitivity, have not been satisfactorily accomplished by the extensometers of the prior art. In some instances, the prior art has possessed a great measuring range but at considerable sacrifice of sensitivity and accuracy, this being particularly true of those devices which operate by means of pinions or a combination thereof with levers. In other instances, prior art instruments fulfill the requirements as to sensitivity and accuracy but their measuring range is not sufficiently great. This class of instruments is generally operated solely by levers, mirrors and the like. In other types of instruments, the indicating hand or pointer can be reset to an initial zero position upon reaching the limit of the measuring range after which the test is continued. Such an operation is done by stages which is unsatisfactory because each resetting operation gives rise to errors which impair the accuracy required.

It is an object of my invention to provide an improved extensometer that, in one continuous operation, will effect correct measurements with great accuracy and sensitivity while at the same time insure that the force of shift is kept as small as possible.

Another object is to provide an improved extensometer that is relatively simple in construction and operation and provides great ease of reading as well as being rugged without impairing its accuracy and sensitivity and which also has improved means for preventing damage to the instrument when the absolute limit of its capacity is reached.

Other objects and advantages will be more apparent to those skilled in the art from the following description of the accompanying drawing in which:

Fig. 1 is a longitudinal section through my improved device shown in somewhat enlarged scale for sake of clarity;

Fig. 2 is a vertical section taken on the line 2—2 of Fig. 1;

Fig. 3 is a plan view of the dial shown in Fig. 1;

Fig. 4 is a transverse section taken on the line 4—4 of Fig. 1;

Fig. 5 is a horizontal section taken on the line 5—5 of Fig. 1;

Fig. 6 is a horizontal section taken substantially on the line 6—6 of Fig. 1;

Fig. 7 is a vertical section of a modified knife edge fulcrum for supporting the pivotal end of a lever which cooperates with the screw spindle of my improved device;

Fig. 8 is a fragmentary side elevation of a modified lever arrangement;

Fig. 9 is a horizontal section taken on the line 9—9 of Fig. 8; and

Fig. 10 is a further modification of the lever system.

In the particular embodiment of the invention, such as is disclosed herein merely for the purpose of illustrating certain specific forms among possible others that the invention might take in practice, I have shown a housing 1 closed on all sides and containing my improved mechanism for transferring strain from the specimen to the indicating means. This transfer mechanism includes a lever 2 pivotally supported as at 3 while the other end of lever 2 has a pin 4, Fig. 6, located laterally of a spindle 5 and extending into a helical thread or groove 6 broadly defining a helical directrix of suitable pitch so that the screw may be rotated by lever 2 when the force of shift is applied thereto. The spindle 5 is suitably journalled in transverse brackets 7 and 8 connected to the sides of housing 1. The pin 4 is maintained in contact with one side of the helical groove 6 by a spring 9 whose ends are secured respectively to lever 2 and to a lower U-shaped rail 14 which forms the lowermost portion for the housing 1. The housing and rail provide a sturdy and compact frame. The pivotal end of lever 2 is provided with an arm 10 which is suitably formed rigidly with the lever 2 and has a gauge point 11 preferably in the form of a knife edge. To determine the gauge length, a second gauge member 12, preferably in the form of a knife edge or other suitable substitute form as may be required, is longitudinally slidably supported within or removable from a dovetailed channel 13 extending along the bottom of rail 14.

The helical spindle 5 is normally rotatably biased in one direction by a small spiral spring 16 whose outer end is connected as at 17, Fig. 2, to housing 1 and whose inner end is connected to a stem 18 projecting from and formed as a part of spindle 5. A dial face or annulus 19 is rotatably supported in a suitable recess beneath a dial cover 20 and has a central opening below which a preferably fixed plate 21 is disposed so as to provide a second dial face 22, Fig. 3. The plate 21 is suitably secured to the sides of housing 1. A pointer 23 is secured to spindle stem 18 while a second pointer 24 is rotated from stem 18 through a reducing pinion and gear generally indicated at 25. Pointer 24 indicates on a dial 22 the number of revolutions made by pointer 23. To initially set dial 19 to zero, preparatory to starting a test, a bevel gear segment 26 is secured to annulus 19 while a bevel pinion is rotated by a finger knob 27 journalled in housing 1.

In operation, the gauge points 11 and 12 are suitably held against a specimen generally indicated at 28 whereupon elongation or contraction of the specimen will cause the lever 2 to swing up or down and thereby cause rotation of spindle 5 through the slide pin 4 and helical groove 6. Pointer 23 will indicate the extent of deformation, although if the deformation is sufficiently large so as to cause multiple revolutions of pointer 24 then pointer 24 can be followed to indicate the total number of revolutions made by pointer 23. It is seen that this will insure a large range for the instrument although if the deformation should tend to exceed the capacity of the instrument, then as lever 2 moves downwardly it will ultimately engage a pin 30 which slidably extends through rail 14 into contact with the surface of specimen 28. Hence engagement of lever 2 with pin 30 will cause gauge point 11 and the left end of housing 1 to be bodily lifted away from the specimen and thereby avoid damage to the instrument.

Instead of employing a pivotal fulcrum such as 3, a knife edge 31, Fig. 7, may be formed on lever 2 and seated in a suitable bracket 32 secured to rail 14. A gauge point 33 is formed integrally with the knife edge fulcrum 31. If it is desired to employ a multiplying action in combination with the helical spindle 5, a combined gauge point and knife fulcrum 34, Fig. 8, is supported upon bracket 35 and is provided with a short lever arm 36 engageable with a lever arm 37 of a lever 38 corresponding to lever 2. Lever 38 is pivotally supported at 39 in the housing 1. Instead of supporting lever 36 by a knife fulcrum, a pivot pin 41 may be inserted through bracket 35 and lever 36. Either modification of Figs. 8 or 10 will give any desired multiplying action, while at the same time maintaining the advantages of the helical spindle. Due to the preferably knife edge contact of lever 36 with arm 37, there is minimum possibility of error notwithstanding the large degree of multiplication that might be obtained. It will, of course, be understood that this instrument is held in contact with the specimen in a usual and well-known manner either by hand or by suitable clamping means, one common form of which is rubber bands encircling the instrument and specimen. Also, if desired, the rail 14 may be formed of Invar steel so as to render the transfer mechanism insensitive against temperature changes. It then becomes possible to measure test specimens under certain temperature conditions.

From the foregoing disclosure it is seen that I have provided an instrument having a large range while maintaining maximum accuracy and sensitivity and at the same time the instrument is rugged, compact and easily placed in operation with excellent vision of the indicating pointers.

It will of course be understood that various changes in details of construction and arrangement of parts may be made by those skilled in the art without departing from the spirit of the invention as set forth in the appended claims.

I claim:

1. The combination in a strain measuring instrument comprising a frame, gauge means carried by said frame for contacting a specimen, strain responsive indicating mechanism carried by said frame, and means for lifting one of said gauge points from the specimen automatically when the strain reaches a predetermined limit.

2. In a strain measuring instrument comprising a frame, a gauge point, means for slidably adjusting said gauge point on said frame so as to effect incremental adjustments, a second gauge point pivotally supported by said frame, and strain indicating means operated by said pivotal gauge point.

3. The combination in a strain measuring instrument comprising a rail, a gauge point slidably carried by said rail so as to effect incremental adjustments of the gauge length, a housing supported by said rail, a second gauge point pivotally connected to said rail, and strain indicating means operated by said pivotal gauge point disposed entirely within said housing in fixed relation thereto and operatively connected to said pivotal gauge point to be actuated thereby upon relative movement between said gauge points.

ARNOLD U. HUGGENBERGER.